(12) United States Patent
Li

(10) Patent No.: US 11,541,273 B2
(45) Date of Patent: Jan. 3, 2023

(54) TREADMILL RACK

(71) Applicant: SHENZHEN SUPER TOP INNOVATION TECHNOLOGY LIMITED, Shenzhen (CN)

(72) Inventor: Haifeng Li, Shenzhen (CN)

(73) Assignee: SHENZHEN SUPER TOP INNOVATION TECHNOLOGY LIMITED, Shenzhen (CN)

( * ) Notice: Subject to any disclaimer, the term of this patent is extended or adjusted under 35 U.S.C. 154(b) by 0 days.

(21) Appl. No.: 17/357,962

(22) Filed: Jun. 24, 2021

(65) Prior Publication Data

US 2022/0362625 A1 Nov. 17, 2022

(30) Foreign Application Priority Data

May 12, 2021 (CN) .......................... 202121014675.3

(51) Int. Cl.
*A63B 22/02* (2006.01)
*A47B 96/02* (2006.01)

(52) U.S. Cl.
CPC .............. *A63B 22/02* (2013.01); *A47B 96/02* (2013.01); *A63B 2225/685* (2013.01)

(58) Field of Classification Search
CPC ......... A47B 19/04; A47B 19/10; A47B 23/02; A47B 57/04; A47B 96/02; A63B 2225/685
See application file for complete search history.

(56) References Cited

U.S. PATENT DOCUMENTS

| | | | | |
|---|---|---|---|---|
| 2,328,471 A | * | 8/1943 | Leffel | A47B 27/00 362/97.4 |
| 4,555,128 A | * | 11/1985 | White | B42D 9/00 281/31 |
| 5,085,427 A | * | 2/1992 | Finn | A47B 23/02 482/148 |
| 5,607,135 A | * | 3/1997 | Yamada | A47G 1/1646 248/463 |
| 6,045,108 A | * | 4/2000 | Cziraky | A47B 97/08 248/461 |
| 7,335,147 B2 | * | 2/2008 | Jones | A63B 71/0622 482/148 |
| 7,887,021 B2 | * | 2/2011 | Shevin-Sandy | F16M 11/041 70/57.1 |
| 8,123,189 B2 | * | 2/2012 | Phifer | A47B 23/044 190/30 |
| 8,205,561 B1 | * | 6/2012 | Bierworth | A61G 5/1094 108/157.11 |

(Continued)

*Primary Examiner* — Daniel J Rohrhoff

(57) ABSTRACT

The present disclosure provides a treadmill rack, including a mounting frame, an adjusting board and a supporting board, where the mounting frame includes a first beam, a second beam, a third beam and a fourth beam, the first beam is parallel to the third beam, the second beam is parallel to the fourth beam, the adjusting board is rotatably connected to the third beam and is configured to be rotated to abut against the first beam, the supporting board is detachably connected with the adjusting board, the first beam, the second beam, the third beam and the fourth beam enclose a receiving cavity, the supporting board is configured to be accommodated in the receiving cavity after being detached from the adjusting board.

19 Claims, 6 Drawing Sheets

(56) References Cited

U.S. PATENT DOCUMENTS

| | | | | |
|---|---|---|---|---|
| 8,424,464 B2* | 4/2013 | Korpi | ............... | A47B 23/044 |
| | | | | 108/42 |
| 8,424,465 B2* | 4/2013 | Florendo, Jr. | ........ | A47B 23/043 |
| | | | | 248/456 |
| 8,567,740 B2* | 10/2013 | Tarnutzer | ............... | B42D 9/00 |
| | | | | 361/679.55 |
| 8,800,937 B1* | 8/2014 | Lee | ............... | F16M 11/10 |
| | | | | 248/65 |
| 9,156,555 B2* | 10/2015 | Shih | ............... | B64D 11/0624 |
| 9,403,051 B2* | 8/2016 | Cutler | ............... | A63B 22/02 |
| 9,468,250 B2* | 10/2016 | Dua | ............... | D04B 1/106 |
| 9,999,297 B1* | 6/2018 | Arceta | ............... | A47B 23/06 |
| 10,874,208 B1* | 12/2020 | Knapp | ............... | A63B 21/4035 |
| 11,277,941 B1* | 3/2022 | Raghupathy | ............ | H05K 7/205 |
| 2006/0192070 A1* | 8/2006 | Chan | ............... | F16M 11/10 |
| | | | | 248/371 |
| 2007/0069101 A1* | 3/2007 | Shevin-Sandy | ...... | F16M 11/041 |
| | | | | 248/441.1 |
| 2009/0179132 A1* | 7/2009 | Qin | ............... | A47B 23/043 |
| | | | | 248/371 |
| 2014/0117061 A1* | 5/2014 | Hadi | ............... | A47B 23/042 |
| | | | | 224/282 |
| 2019/0038018 A1* | 2/2019 | Hill | ............... | F16M 13/022 |
| 2020/0398106 A1* | 12/2020 | Gettle | ............... | A63B 22/0046 |

* cited by examiner

TREADMILL RACK

CROSS-REFERENCE TO RELATED APPLICATIONS

This application claims priority to Chinese Patent Application No. 202121014675.3, filed May 12, 2021, which is hereby incorporated by reference herein as if set forth in its entirety.

TECHNICAL FIELD

The present disclosure relates to a field of furniture, and in particular to a treadmill rack.

BACKGROUND

Treadmill is a type of fitness equipment for running and walking sports, in which some users may walk and meanwhile watch videos on their phones or tablets. Since no supporting rack for the phones or tablets are provided in existing treadmills, the users can only hold the phones or tablets in hand and watch the videos while walking in the treadmills. It may result in soreness of arms when the users hold the phones or tablets in hand for a long period. In particular, in a case that the user watches videos in a handheld tablet which should be supported by both hands due to its large size, when an accident occurs, the user needs to release his hand(s) from the tablet to balance his body by holding an armrest of the treadmill, which causes the tablet to fall off and, in severe cases, even be damaged thereby.

SUMMARY

The present disclosure provides a treadmill rack for solving the aforementioned problem.

The present disclosure is realized by the following technical solutions.

The present disclosure provides a treadmill rack, including a mounting frame, an adjusting board and a supporting board. The mounting frame includes a first beam, a second beam, a third beam and a fourth beam. The first beam is parallel to the third beam, and the second beam is parallel to the fourth beam. The adjusting board is rotatably connected to the third beam and is configured to be rotated to abut against the first beam. The supporting board is detachably connected with the adjusting board. The first beam, the second beam, the third beam and the fourth beam enclose a receiving cavity. The supporting board is configured to be accommodated in the receiving cavity after being detached from the adjusting board.

In one embodiment, the treadmill rack further includes a support member and a fifth beam. The fifth beam is fixedly received in the receiving cavity and defines a plurality of limiting slots thereon. The supporting member has one end rotatably connected to the adjusting board, and one other end engaged with one of the limiting slots in such a way that the adjusting board is supported at a certain inclination angle relative to the mounting frame.

In one embodiment, the treadmill rack further includes a limiting member fixed to the adjusting board. The support member passes through the limiting member and is movably connected to the limiting member.

In one embodiment, the supporting board is provided with a positioning post, the adjusting board defines a first positioning hole thereon, and the third beam defines a second positioning hole thereon communicating with the receiving cavity. The positioning post is configured to be movably received in the first positioning hole or the second positioning hole.

In one embodiment, the treadmill rack further includes a hinge. The hinge has one piece fixed to the adjusting board, and one other piece fixed to the third beam.

In one embodiment, the treadmill rack further includes an engaging member. The engaging member includes a mounting portion fixed to the adjusting board and a limiting portion. The limiting portion has one end fixed to the mounting portion, and one other end provided with a hook. The first beam defines a latching flute thereon. The adjusting board abuts against the first beam when the hook is engaged with the latching flute.

In one embodiment, a buckling portion is provided at an end of the limiting portion away from the mounting portion. The buckling portion is bent with respect to the limiting portion.

In one embodiment, the treadmill rack further includes a first placing board and a second placing board which are fixedly mounted on the mounting frame, respectively. The adjusting board is disposed between the first placing board and the second placing board.

In one embodiment, the first placing board defines a first placing slot thereon, the second placing board defines a second placing slot thereon, and the adjusting board defines a third placing slot thereon.

In one embodiment, the treadmill rack further includes a sixth beam and a seventh beam which are fixedly received in the receiving cavity. The sixth beam is disposed closely to the second beam. The seventh beam is disposed closely to the fourth beam.

In one embodiment, the first beam is provided at a bottom thereof symmetrically with a first anti-skid layer and a second anti-skid layer. The second beam is provided at a bottom thereof with a third anti-skid layer. The third beam is provided at a bottom thereof symmetrically with a fourth anti-skid layer and a fifth anti-skid layer. The fourth beam is provided at a bottom thereof with a sixth anti-skid layer. The sixth beam is provided at a bottom thereof with a seventh anti-skid layer. The seventh beam is provided at a bottom thereof with an eighth anti-skid layer.

In one embodiment, the treadmill rack further includes a first strap and a second strap. The first strap passes through the second beam and surrounds the sixth beam. The second strap passes through the fourth beam and surrounds the seventh beam.

The invention has advantages as follows.

The treadmill rack according to the present disclosure may be securely mounted on the armrest of the treadmill, the phone or tablet may be supported by the supporting board, and an inclination angle of the phone or tablet is adjustable by adjusting the inclination angle of the adjusting board, resulting in convenience for the user to watch.

DETAILED DESCRIPTION

The present disclosure will be further described below with reference to the accompanying drawings for more clearly and fully discussing the technical solutions of the present disclosure.

Figure 1:
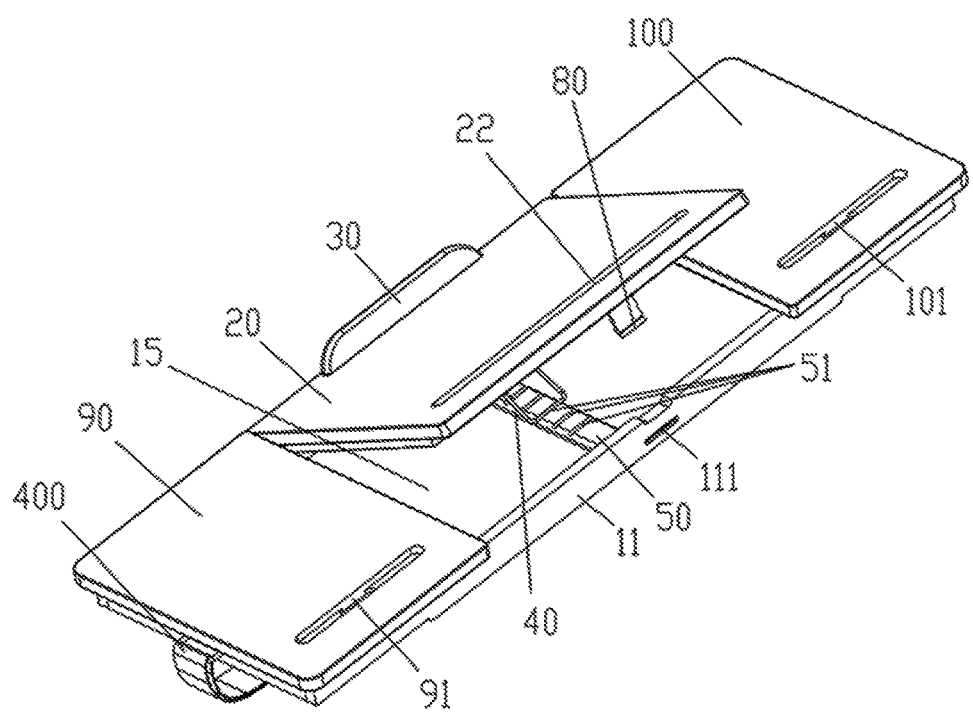
FIG. 1 is a perspective view of a treadmill rack according to the present disclosure.
Figure 2:
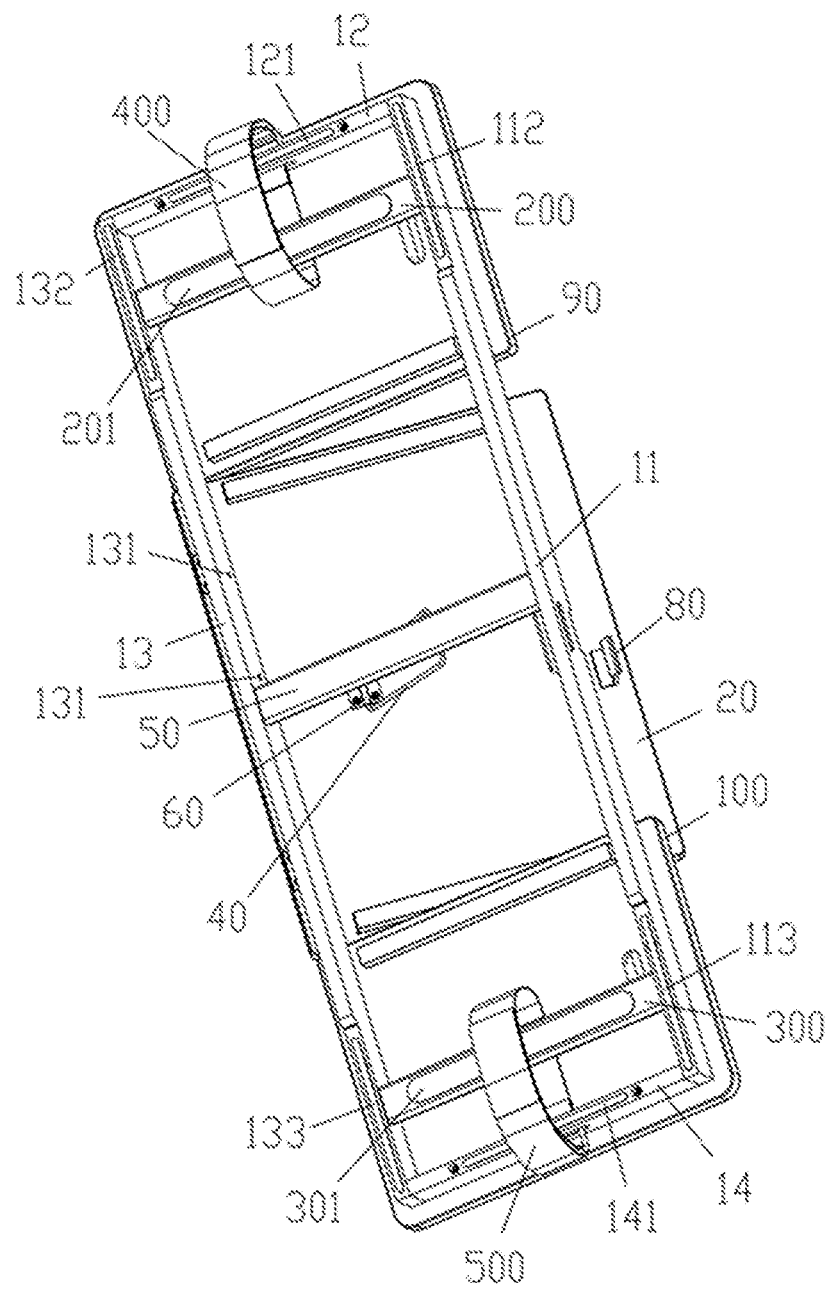
FIG. 2 is another perspective view of the treadmill rack according to the present disclosure.
Figure 3:
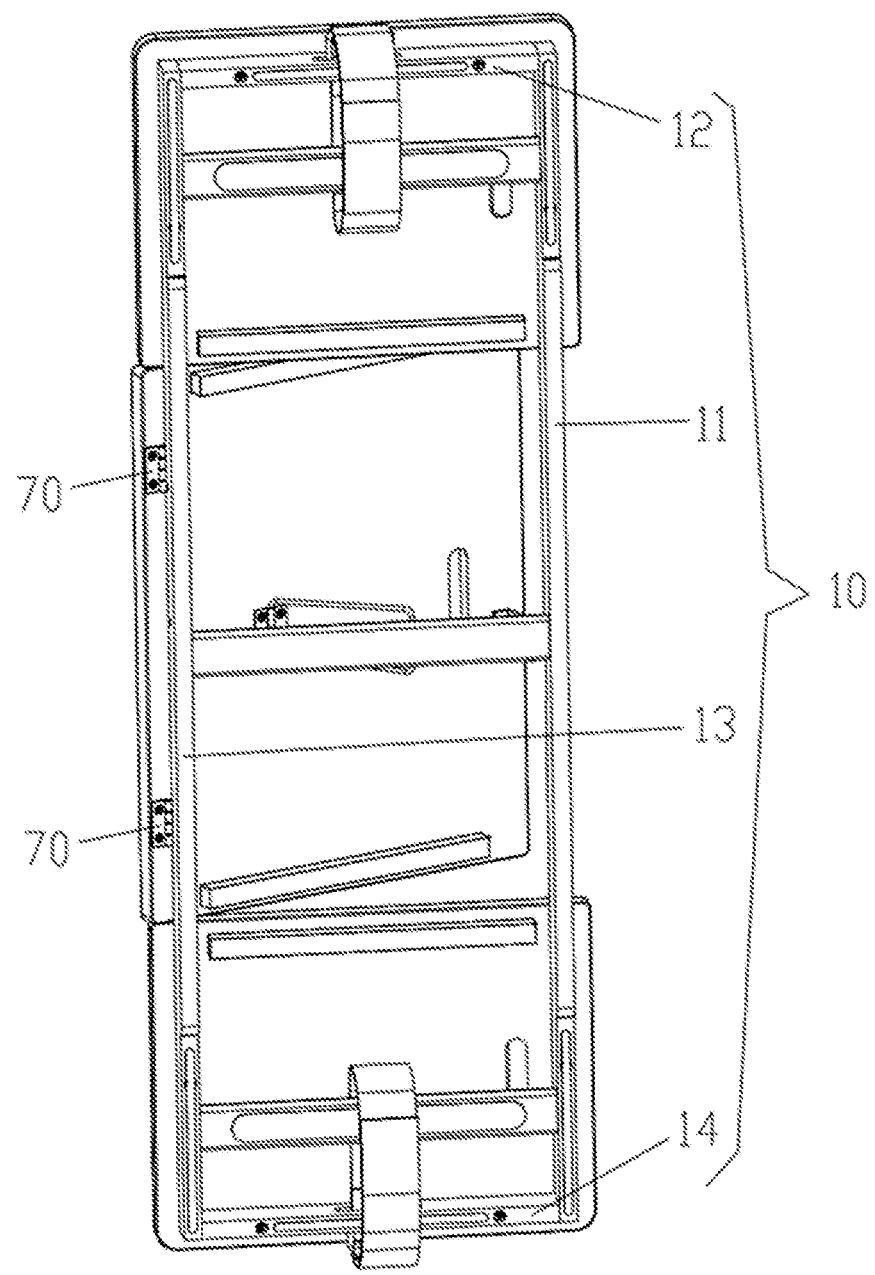
FIG. 3 is a further perspective view of the treadmill rack according to the present disclosure.
Figure 4:
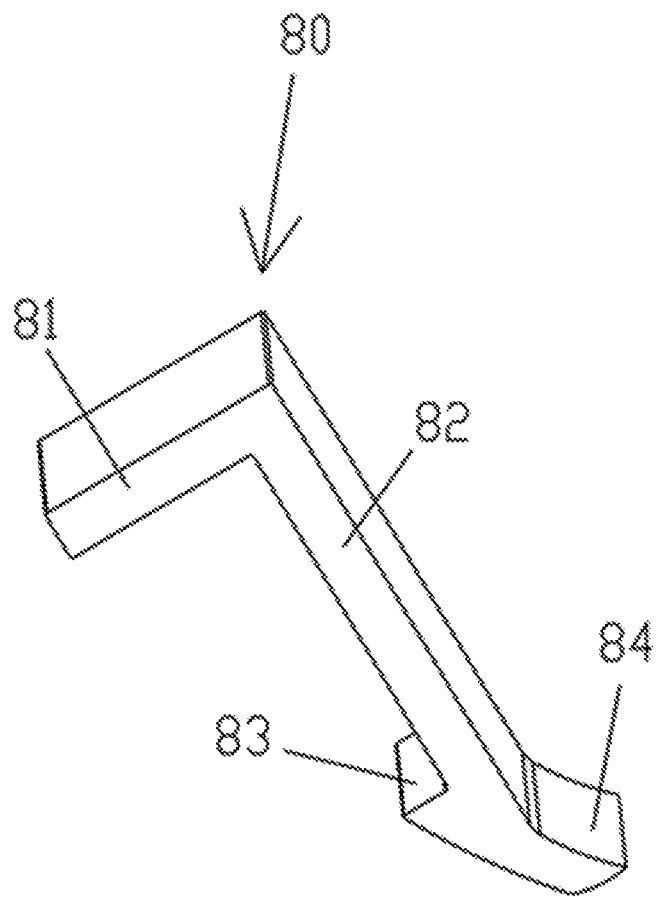
FIG. 4 is a perspective view of an engaging member of the treadmill rack according to the present disclosure.
Figure 5:
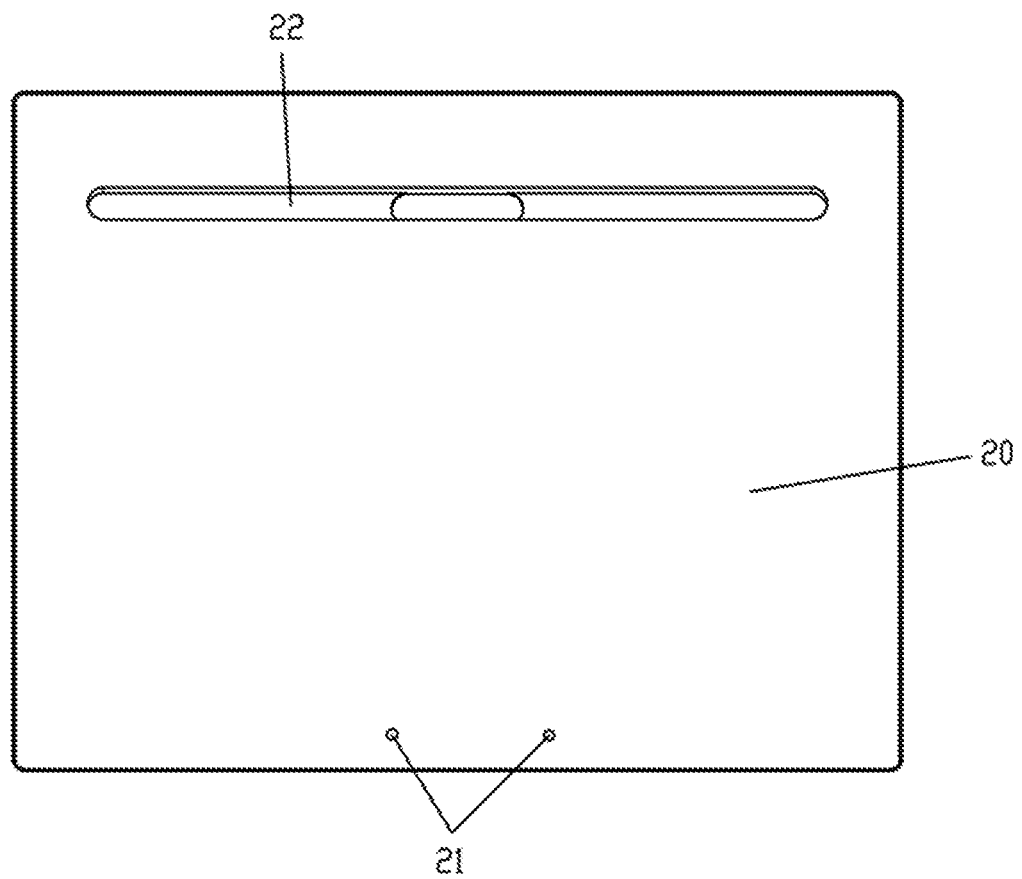
FIG. 5 is a perspective view of an adjusting board of the treadmill rack according to the present disclosure.
Figure 6:
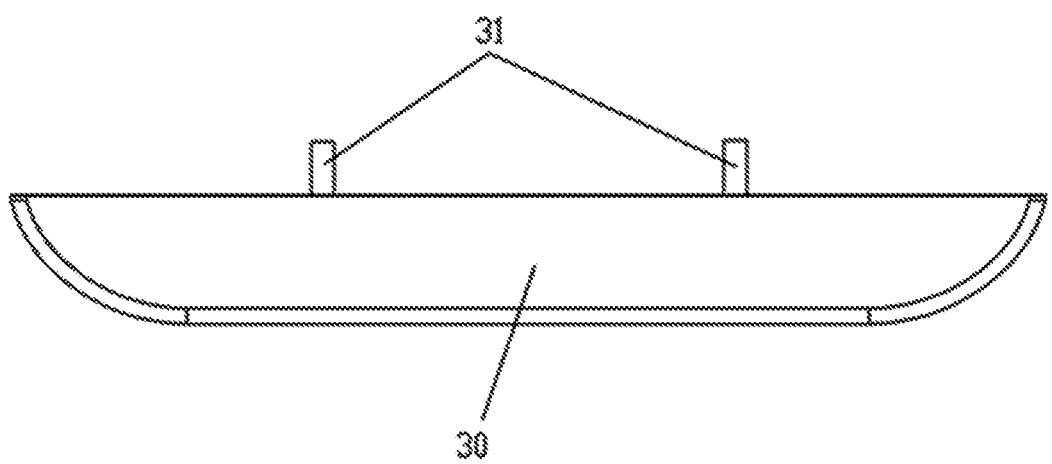
FIG. 6 is a perspective view of a supporting board of the treadmill rack according to the present disclosure.

As shown in FIG. 1 to FIG. 6, a treadmill rack is provided according to an embodiment of the present disclosure. The treadmill rack includes a mounting frame 10, an adjusting board 20 and a supporting board 30. The mounting frame 10 includes a first beam 11, a second beam 12, a third beam 13 and a fourth beam 14. The first beam 11 is parallel to the third beam 13, and the second beam 12 is parallel to the fourth beam 14. The adjusting board 20 is rotatably connected to the third beam 13. The adjusting board 20 is configured to be rotated to abut against the first beam 11. The supporting board 30 is detachably connected with the adjusting board 20. The first beam 11, the second beam 12, the third beam 13 and the fourth beam 14 enclose a receiving cavity 15. After being detached from the adjusting board 20, the supporting board 30 can be accommodated in the receiving cavity 15.

In this embodiment, the first beam 11, the second beam 12, the third beam 13 and the fourth beam 14 are sequentially connected with one another to form a rectangular frame. The adjusting board 20 is rotatable relative to the third beam 13 so as to adjust an inclination angle of the adjusting board 20 relative to the mounting frame 10. In use, the treadmill rack is fixed on an armrest of the treadmill with the mounting frame 10 abutting against the armrest of the treadmill. A phones or tablet may be supported by the supporting board 30, and an inclination angle of the phone or tablet is adjustable by adjusting the inclination angle of the adjusting board 20, resulting in convenience for the user to watch.

Further, the treadmill rack further includes a support member 40 and a fifth beam 50. The fifth beam 50 is fixedly received in the receiving cavity 15, and a plurality of limiting slots 51 are defined on the fifth beam 50. The supporting member 40 has one end rotatably connected to the adjusting board 20, and one other end engaged with one of the limiting slots 51 in such a way that the adjusting board 20 is supported at a certain inclination angle relative to the mounting frame 10.

Further, the treadmill rack further includes a limiting member 60 fixed to the adjusting board 20, and the support member 40 passes through the limiting member 60 and is movably connected to the limiting member 60.

In this embodiment, the adjusting board 20 and the support member 40 are rotated, and the support member 40 is engaged with the single limiting groove 51, such that the inclination angle of the adjusting board 20 relative to the mounting frame 10 is adjusted. The fifth beam 50 has opposing ends fixed to the first beam 11 and the third beam 13, respectively.

Further, the supporting board 30 is provided with a positioning post 31, the adjusting board 20 defines a first positioning hole 21 thereon, and the third beam 13 defines a second positioning hole 131 communicating with the receiving cavity 15. The positioning post 31 is configured to be movably received in the first positioning hole 21 or the second positioning hole 131.

In this embodiment, when the phone or tablet is supported by the supporting board 30, the position post 31 is inserted into the first positioning hole 21 to form a secure connection between the supporting board 30 and the adjusting board 20, and the supporting board 30 is perpendicular to the adjusting board 20.

In this present embodiment, during transportation or storage of the treadmill rack, the positioning post 31 is inserted into the second positioning hole 131 to form a secure connection between the supporting board 30 and the third beam 13, and the supporting board 30 is accommodated in the receiving cavity 15. In this way, a space occupied by the treadmill rack is reduced and the transportation or storage of the treadmill rack is facilitated.

Further, the treadmill rack further includes a hinge 70, the hinge 70 has one piece fixed to the adjusting board 20, and one other piece fixed to the third beam 13.

In this embodiment, the adjusting board 20 is movably connected to the third beam 13 through the hinge 70, such that the adjusting board 20 is rotatable relative to the third beam 13.

Further, the treadmill rack further includes an engaging member 80. The engaging member 80 includes a mounting portion 81 fixed to the adjusting board 20 and a limiting portion 82. The limiting portion 82 has one end fixed to the mounting portion 81, and one other end provided with a hook 83. The first beam 11 defines a latching flute 111 thereon. When the hook 83 is engaged with the latching flute 111, the adjusting board 20 abuts against the first beam 11.

In this embodiment, when the adjusting board 20 needs to be laid flat for use, the hook 83 and the latching flute 111 are engaged to form a secure connection between the adjusting board 20 and the first beam 11, and meanwhile the adjusting board 20 abuts against the first beam 11.

Further, a buckling portion 84 is provided at an end of the limiting portion 82 away from the mounting portion 81, and the buckling portion 84 is bent with respect to the limiting portion 82.

In this embodiment, the engaging member 80 is integrally formed, resulting in an increased strength. The buckling portion 84 is bent with respect to the limiting portion 82, which facilitate the user to unclench the limiting portion 82 from the first beam 11, so as to disengage the hook 83 from the latching flute 111.

Further, the treadmill rack further includes a first placing board 90 and a second placing board 100 which are fixedly mounted on the mounting frame 10, respectively. The adjusting board 20 is disposed between the first placing board 90 and the second placing board 100.

In this embodiment, when the hook 83 is engaged with the latching flute 111, the adjusting board 20 abuts against the first beam 11. Meanwhile, the first placing board 90, the second placing board 100 and the adjusting board 20 are flush with each other. The first placing board 90 and the second placing board 100 are used for placement of articles.

Further, the first placing board 90 defines a first placing slot 91 thereon, the second placing board 100 defines a second placing slot 101 thereon, and the adjusting board 20 defines a third placing slot 22 thereon.

In this embodiment, the first placing slot 91, the second placing slot 101 and the third placing slot 22 are inclined at a same angle. When the phone or tablet is placed in the first placing slot 91 and supported by an inner wall of the first placing slot 91, an included angle between the phone or tablet and the first placing board 90 is an obtuse angle, resulting in convenience for the user to watch.

Further, the treadmill rack further includes a sixth beam 200 and a seventh beam 300 which are fixedly received in the receiving cavity 15. The sixth beam 200 is disposed closely to the second beam 12. The seventh beam 300 is disposed closely to the fourth beam 14.

In this embodiment, the sixth beam 200 has opposing ends fixed to the first beam 11 and the third beam 13, respectively. The seventh beam 300 has opposing ends fixed to the first beam 11 and the third beam 13, respectively.

Further, the first beam 11 is provided at a bottom thereof symmetrically with a first anti-skid layer 112 and a second anti-skid layer 113. The second beam 12 is provided at a bottom thereof with a third anti-skid layer 121. The third beam 13 is provided at a bottom thereof symmetrically with a fourth anti-skid layer 132 and a fifth anti-skid layer 133. The fourth beam 14 is provided at a bottom thereof with a sixth anti-skid layer 141. The sixth beam 200 is provided at a bottom thereof with a seventh anti-skid layer 201. The seventh beam 300 is provided at a bottom thereof with an eighth anti-skid layer 301.

In this embodiment, when the treadmill rack is mount on the armrests of the treadmill, The first anti-slip layer 112, the third anti-slip layer 121, the fourth anti-slip layer 132, and the seventh anti-slip layer 201 abut against one of the armrests of the treadmill, while the second anti-slip layer 113, the fifth anti-slip layer 133, the sixth anti-slip layer 141, and the eighth anti-slip layer 301 abut against the other one of the armrests of the treadmill, improving a friction force so that the treadmill rack is securely mounted on the armrests of the treadmill.

Further, the treadmill rack further includes a first strap 400 and a second strap 500. The first strap 400 passes through the second beam 12 and surrounds the sixth beam 200. The second strap 500 passes through the fourth beam 14 and surrounds the seventh beam 300.

In this embodiment, the mounting frame 10 is fastened to two armrests of the treadmill by the first strap 400 and the second strap 500, respectively, such that treadmill rack is securely mounted on the armrests of the treadmill.

It should be noted that the present disclosure may have other various embodiments. Modifications and variations made by those skilled in the art based on the embodiments according to the present disclosure without any creative work also fall within the scope of the present disclosure.

What is claimed is:

1. A treadmill rack, comprising a mounting frame, an adjusting board and a supporting board, wherein the mounting frame comprises a first beam, a second beam, a third beam and a fourth beam, the first beam is parallel to the third beam, the second beam is parallel to the fourth beam, the adjusting board is rotatably connected to the third beam and is configured to be rotated to abut against the first beam, the supporting board is detachably connected with the adjusting board, the first beam, the second beam, the third beam and the fourth beam enclose a receiving cavity, the supporting board is configured to be accommodated in the receiving cavity after being detached from the adjusting board, wherein the supporting board is provided with a positioning post, the adjusting board defines a first positioning hole thereon, the third beam defines a second positioning hole thereon communicating with the receiving cavity, and the positioning post is configured to be movably received in the first positioning hole or the second positioning hole.

2. The treadmill rack according to claim 1, further comprising a support member and a fifth beam, wherein the fifth beam is fixedly received in the receiving cavity and defines a plurality of limiting slots thereon, the supporting member has one end rotatably connected to the adjusting board, and one other end engaged with one of the limiting slots in such a way that the adjusting board is supported at a certain inclination angle relative to the mounting frame.

3. The treadmill rack according to claim 2, further comprising a limiting member fixed to the adjusting board, wherein the support member passes through the limiting member and is movably connected to the limiting member.

4. The treadmill rack according to claim 1, further comprising a hinge, wherein the hinge has one piece fixed to the adjusting board, and one other piece fixed to the third beam.

5. The treadmill rack according to claim 1, further comprising an engaging member, wherein the engaging member comprises a mounting portion fixed to the adjusting board and a limiting portion, the limiting portion has one end fixed to the mounting portion, and one other end provided with a hook, the first beam defines a latching flute thereon, and the adjusting board abuts against the first beam when the hook is engaged with the latching flute.

6. The treadmill rack according to claim 5, wherein a buckling portion is provided at an end of the limiting portion away from the mounting portion, and the buckling portion is bent with respect to the limiting portion.

7. The treadmill rack according to claim 1, further comprising a first placing board and a second placing board which are fixedly mounted on the mounting frame, respectively, and the adjusting board is disposed between the first placing board and the second placing board.

8. The treadmill rack according to claim 7, wherein the first placing board defines a first placing slot thereon, the second placing board defines a second placing slot thereon, and the adjusting board defines a third placing slot thereon.

9. The treadmill rack according to claim 1, further comprising a sixth beam and a seventh beam which are fixedly received in the receiving cavity, the sixth beam is disposed closely to the second beam, and the seventh beam is disposed closely to the fourth beam.

10. The treadmill rack according to claim 9, wherein the first beam is provided at a bottom thereof symmetrically with a first anti-skid layer and a second anti-skid layer, the second beam is provided at a bottom thereof with a third anti-skid layer, the third beam is provided at a bottom thereof symmetrically with a fourth anti-skid layer and a fifth anti-skid layer, the fourth beam is provided at a bottom thereof with a sixth anti-skid layer, the sixth beam is provided at a bottom thereof with a seventh anti-skid layer, and the seventh beam is provided at a bottom thereof with an eighth anti-skid layer.

11. The treadmill rack according to claim 9, further comprising a first strap and a second strap, the first strap passes through the second beam and surrounds the sixth beam, and the second strap passes through the fourth beam and surrounds the seventh beam.

12. A treadmill rack, comprising:
a mounting frame, comprising a first beam, a second beam, a third beam, and a fourth beam; the first beam being parallel to the third beam, the second beam being parallel to the fourth beam;
an adjusting board rotatably connected to the third beam and configured to be rotated to abut against the first beam;
a supporting board detachably connected with the adjusting board; and
a first placing board and a second placing board that are fixedly mounted on the mounting frame, respectively;
wherein the first beam, the second beam, the third beam, and the fourth beam enclose a receiving cavity, the supporting board is configured to be accommodated in the receiving cavity after being detached from the adjusting board, and the adjusting board is disposed between the first placing board and the second placing board.

13. The treadmill rack according to claim 12, wherein the first placing board defines a first placing slot thereon, the second placing board defines a second placing slot thereon, and the adjusting board defines a third placing slot thereon.

14. The treadmill rack according to claim 13, wherein the first placing slot, the second placing slot, and the third placing slot are inclined at a same angle.

15. The treadmill rack according to claim 12, further comprising a support member and a fifth beam, wherein the fifth beam is fixedly received in the receiving cavity and defines a plurality of limiting slots thereon, the supporting member has one end rotatably connected to the adjusting board, and one other end engaged with one of the limiting slots in such a way that the adjusting board is supported at a certain inclination angle relative to the mounting frame.

16. The treadmill rack according to claim 15, wherein the fifth beam has opposing ends fixed to the first beam and the third beam, respectively.

17. A treadmill rack, comprising:
- a mounting frame, comprising a first beam, a second beam, a third beam, and a fourth beam; the first beam being parallel to the third beam, the second beam being parallel to the fourth beam;
- an adjusting board rotatably connected to the third beam and configured to be rotated to abut against the first beam;
- a supporting board detachably connected with the adjusting board; and
- an engaging member, comprising a mounting portion fixed to the adjusting board and a limiting portion;
- wherein the first beam, the second beam, the third beam, and the fourth beam enclose a receiving cavity, the supporting board is configured to be accommodated in the receiving cavity after being detached from the adjusting board;
- wherein the limiting portion has one end fixed to the mounting portion, and one other end provided with a hook, the first beam defines a latching flute thereon, and the adjusting board abuts against the first beam when the hook is engaged with the latching flute; the limiting portion is provided with a buckling portion at an end thereof away from the mounting portion, and the buckling portion is bent with respect to the limiting portion.

18. The treadmill rack according to claim 17, further comprising a support member and a fifth beam, wherein the fifth beam is fixedly received in the receiving cavity and defines a plurality of limiting slots thereon, the supporting member has one end rotatably connected to the adjusting board, and one other end engaged with one of the limiting slots in such a way that the adjusting board is supported at a certain inclination angle relative to the mounting frame.

19. The treadmill rack according to claim 18, wherein the fifth beam has opposing ends fixed to the first beam and the third beam, respectively.

\* \* \* \* \*